(12) United States Patent
Quarini

(10) Patent No.: US 6,916,383 B2
(45) Date of Patent: Jul. 12, 2005

(54) CLEANING AND SEPARATION IN CONDUITS

(75) Inventor: Giuseppe L. Quarini, Bristol (GB)

(73) Assignee: University of Bristol, Bristol (GB)

( * ) Notice: Subject to any disclaimer, the term of this patent is extended or adjusted under 35 U.S.C. 154(b) by 14 days.

(21) Appl. No.: 10/169,709

(22) PCT Filed: Jan. 10, 2001

(86) PCT No.: PCT/GB01/00093
§ 371 (c)(1),
(2), (4) Date: Dec. 2, 2002

(87) PCT Pub. No.: WO01/51224
PCT Pub. Date: Jul. 19, 2001

(65) Prior Publication Data
US 2003/0140944 A1 Jul. 31, 2003

(30) Foreign Application Priority Data
Jan. 11, 2000 (GB) .............................. 0000560

(51) Int. Cl.[7] ................................................ B08B 9/04
(52) U.S. Cl. ..................... 134/8; 134/2; 134/4; 134/6; 134/7; 134/22.1; 134/22.11; 134/22.14; 134/22.19; 134/34; 134/35; 134/36; 134/40; 134/41; 134/42
(58) Field of Search ................................ 134/2, 4, 6, 7, 134/8, 22.1, 22.11, 22.14, 22.19, 34, 35, 36, 40, 41, 42

(56) References Cited

U.S. PATENT DOCUMENTS

| | | | |
|---|---|---|---|
| 3,085,916 A | * | 4/1963 | Zimmie et al. .......... 134/22.19 |
| 4,216,026 A | | 8/1980 | Scott |
| 4,220,012 A | | 9/1980 | Brister |
| 4,383,783 A | | 5/1983 | Kruka et al. |
| 4,473,408 A | | 9/1984 | Purinton, Jr. |
| 4,898,197 A | * | 2/1990 | Barry et al. ................... 134/1 |
| 5,300,152 A | | 4/1994 | Lowther |
| 6,041,811 A | | 3/2000 | Walter et al. |
| 6,485,577 B1 | | 11/2002 | Kiholm |
| 2003/0140944 A1 | * | 7/2003 | Quarini ........................ 134/8 |

FOREIGN PATENT DOCUMENTS

| | | | | |
|---|---|---|---|---|
| JP | 04074578 A | * | 3/1992 | ............. B08B/9/06 |
| JP | 05261349 A | * | 10/1993 | ............. B08B/9/02 |
| SU | 1141153 | | 2/1985 | |
| SU | 1625886 | | 2/1991 | |
| WO | WO03/006185 A1 | * | 1/2003 | |

* cited by examiner

Primary Examiner—Sharidan Carrillo
(74) Attorney, Agent, or Firm—Stites & Harbison PLLC; Douglas E. Jackson

(57) ABSTRACT

A coherent body (B) of wet crushed ice is pumped along a pipe (5). The crushed ice body can be used as a means of cleaning the pipe wall, as a means of driving a product liquid out of the pipe for recovery, or as a barrier for preventing mixing of two different bodies of liquid (1,2) in the pipe to either side of it. Being coherent but flowable and non-tensile, the mass of crushed ice can negotiate internal constrictions, obstructions and junctions of the pipe readily, unlike conventional solid or gelled pigs.

11 Claims, 2 Drawing Sheets

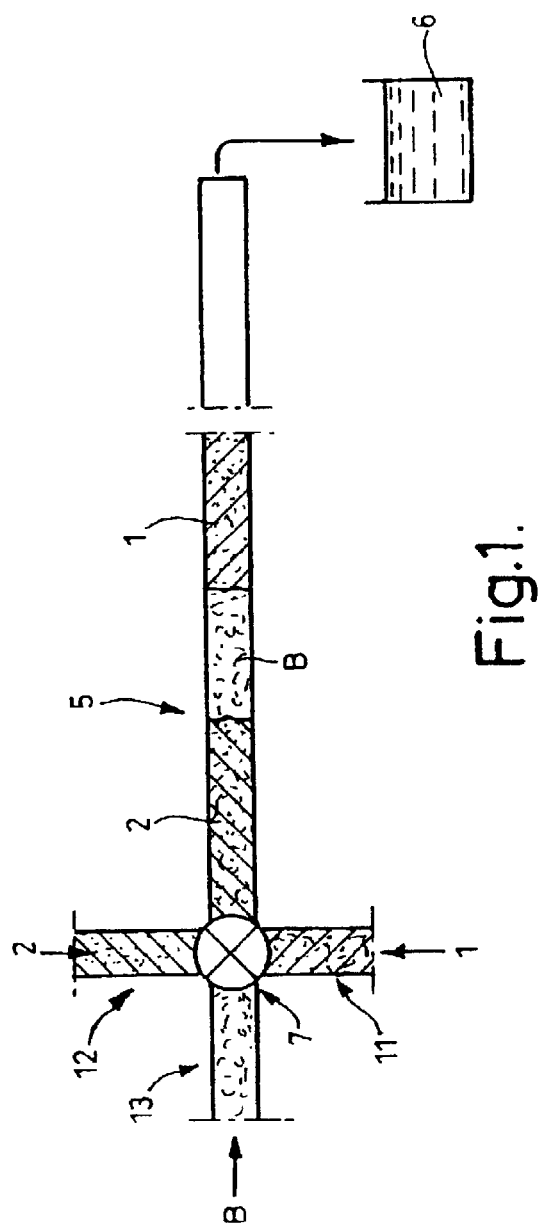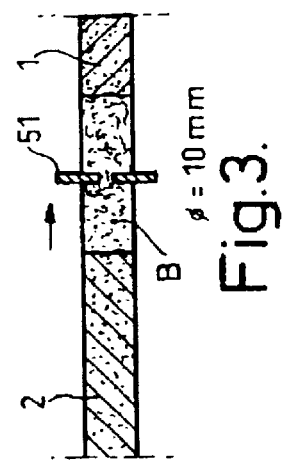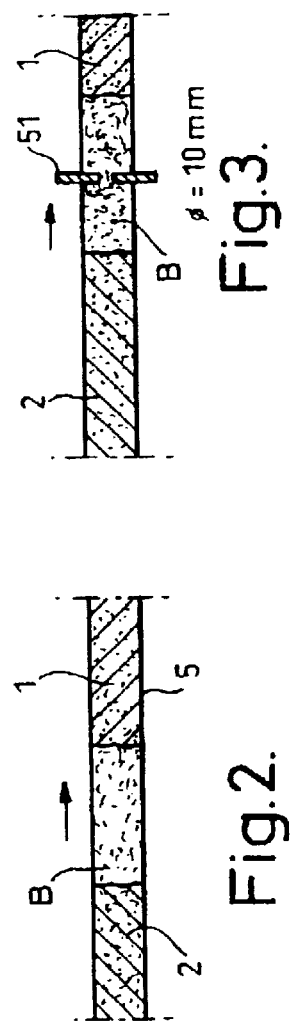

CLEANING AND SEPARATION IN CONDUITS

FIELD OF THE INVENTION

This invention relates to the cleaning or clearing of the interiors of fluid flow conduits, in particular pipes and tubes, and in other aspects to providing a barrier at the end of a body of fluid passing in the conduit, to prevent mixing with another body of fluid in the same conduit. We particularly envisage application of these new techniques in the flow conduits of processing machinery for food products and food components, but the invention also has applications in other fields.

BACKGROUND

By way of background, a procedure known as "pigging" is well-established in the fields of oil and gas recovery and distribution. This involves driving a "pig", being a solid body or device shaped to fit the pipeline interior, along the pipe under pressure. The pig may have scrapers or brushes to shift contaminants from the pipeline's interior surface (U.S. Pat. No. 5,457,841 and U.S. Pat. No. 5,903,945); additionally or alternatively it may be adapted to absorb or otherwise take up debris in the pipeline (U.S. Pat. No. 4,216,026). It is known to make a pipeline pig wholly or partly from an elastically deformable material which can pass bends or occasional irregularities such as welding joints in the pipeline without damage, while contacting the pipe surface firmly (see U.S. Pat. No. 4,389,461 and U.S. Pat. No. 5,924,158). It has been proposed to use a solid bullet of ice as a pig, since it will disintegrate spontaneously and harmlessly if it gets stuck. See e.g. U.S. Pat. No. 4,898,197 and U.S. Pat. No. 4,724,007. It has also been proposed to pass a self-sustaining gelled mass, made by gelling a hydrocarbon, along the pipeline e.g. to separate one product flow from another, or to keep the pipe dry when not in use.

Another established use of pigs is in the cleaning of heat exchanger tubes which suffer from the accumulation of internal residues from manufacture or during use: see U.S. Pat. No. 4,860,821.

In most piping systems however it is normal for cleaning to use direct methods such as brushing and/or flushing using cleaning liquids, which are easier to control and cheaper than pigs. Also, pigs cannot be used where fluid flow conduits are of substantially varying cross-section or include internal obstructions, whereas liquids can.

THE INVENTION

In one aspect what we propose is a method of clearing the interior of a fluid flow conduit, so as to clean its interior surface and/or to provide a barrier at the end of a body of fluid passing along the conduit, characterized by causing a fluid, plastic mass or agglomerate consisting essentially of solid particles cohering by means of a wetting liquid to pass along the conduit in contact with its interior surface.

The wetting liquid is preferably non-gelled. Preferred wetting liquids are aqueous. We also prefer that the wetting liquid wets the conduit interior surface so that the solid particles slide over the surface.

A second independent aspect, representing also a preferred mode of implementing the first aspect, is to pass a fluid, plastic mass or agglomerate of a mixture of solid particles with a wetting liquid which is, consists essentially of or comprises a melt liquid derived from the solid of the solid particles. Such a mixture may for example conveniently be prepared by comminuting the solid and using it at a temperature near its melting point.

A particular virtue of these proposals is that a wet, coherent, flowable agglomerate, unlike known deformable or gelled pigs which can generally be made to tolerate only a modest deformation before they break or lose their effectiveness, can provide a truly fluid, plastic and non-tensile entity which is able to exert its effect even where there is substantial change in cross sectional shape and/or size, sharp bending or even branching of the fluid flow conduit. There is usually no need to adapt the pig analogue of the present proposal in any particular way for the given size or shape of conduit involved, provided that the particles are substantially smaller than the conduit. An essentially fluid, divisible mass can easily be fed through conduit cross-sections that no conventional pig could pass.

Conversely, by contrast with the use of conventional cleaning liquids, we find that a flowable mass of the kind described consisting substantially of cohered solid particles can easily be made to pass along a conduit without disintegrating in the conduit or dispersing into an adjacent liquid. Also the particles can give a fricative cleaning effect on the conduit wall that is not available with a liquid. Preferably the particles are hard and preferably also angular.

A third independent embodiment of our proposals is to provide a cleaning, clearing, separating or barrier function as described above by passing a mass of comminuted ice along the conduit. Such an ice pig has many advantages. We find that it is sufficiently flowable, plastic and divisible to pass readily through many shapes and sizes of conduit interior. It is typically sufficiently coherent—by virtue of its own meltwater—that it does not disintegrate or disperse in the conduit.

Furthermore, ice is easily prepared, economical and safe. Accordingly, it becomes practical to apply the present techniques in the flow conduits of food processing machinery.

Conventionally, in food processing plants material has to be removed from the duct work or piping every time the plant needs cleaning and when the product line is changed. Removing food material from ducts is expensive, slow and usually wasteful because it is difficult to prevent back-mixing or diffusion of the food material into the cleaning fluid or into the subsequent product line, as the case may be. All of these difficulties lead to increased cost.

By contrast, even when a food material does get mixed with ice it is often not entirely spoiled but can be used e.g. for animal feed.

In our work we have found that slush ice or comminuted ice is readily preparable in a form suitable for passing through piping, including bends, junctions and cross-sectional changes such as orifice plates and mixing sections.

Because the simultaneous presence of water and ice gives best results, we prefer to include a freezing point depressant in the water used to make the ice. This increases the range of temperature over which coexistent ice and water can persist. Simple non-toxic compounds such as sugar and salt can be used.

The use of a mass of frozen particles wetted by the corresponding melt liquid is not confined to ordinary ice, with or without freezing point depressant. For example in chemical and biochemical processing, crushes of frozen organic solvents can be used. An example is peracetic acid, which freezes readily, is highly active against biocontaminants and breaks down to harmless compounds in due course, in contrast with the chlorine-containing bleaches conventionally used.

A further particular aspect of our proposal is in the context of an overall process or situation in which a process liquid in the nature of a mixture and/or solution is present in or passes along a fluid conduit. We propose to carry out any of the cleaning, clearing or barrier operations as proposed herein in that conduit, using for the fluid agglomerate a frozen material which either is the native process liquid, frozen and broken into particles, or is compatible with it in the sense of being substantially or entirely free of ingredients which are not ingredients of the process liquid. Such a procedure can be especially congenial in that any melting or mixing of the agglomerate body with adjacent process liquid in the conduit does not significantly contaminate it. Since many process liquids consist of or comprise solutions, the freezing point depressant function is then intrinsic to the native material which is therefore inherently suitable for freezing and crushing to provide an effective cohering agglomerate body.

Certain practical aspects of the methods disclosed herein can readily be determined by a skilled person on the basis of the technical context and technical purpose.

Thus particle size for example is not usually critical in the agglomerate, provided that the largest particle can pass all the way through the relevant conduit system. In practice, using crushed frozen material, there will be a wide range of particle sizes. Purely by way of illustration, in crushed ice suitable for use in food processing machinery—whose pipe dimensions range down from about 100 mm through about 25 mm (conventional) to about 10 mm in smaller branches—ice particles up to about 5 mm will be acceptable and effective.

The proportion of solid and liquid in the agglomerate mass is also not critical provided that the mass coheres sufficiently to move as a body along the relevant conduit under the relevant conditions. Typically the solids content would be at least 30% by weight, however.

The speed at which the agglomerate mass is driven through the conduit may vary largely according to the situation. Anything from 0.05 to 5 m/s might be appropriate, for example.

Particular embodiments of our proposals involve pumping the fluid mass (agglomerate) along a fluid flow conduit having one or more of

- substantial changes in cross-sectional area e.g. greater than 20%;
- internal obstructions, such as probes or sensors, projecting into the conduit space;
- branching or merging of conduits.

In the case of branching, the procedure may involve the fluid mass dividing to follow different branches simultaneously.

In particular embodiments of the procedure the mentioned fluid mass may be used for any one or more of:

- driving a body of fluid material in front of it along the conduit;
- more generally, forming a barrier between a first, downstream body of fluid material in the conduit and a second, upstream body e.g. of a different fluid material, or an empty section of conduit;
- cleaning the interior surface of the conduit.

Usually the present agglomerate is a longitudinally-localised body in the conduit e.g. not more than 20 times as long as it is wide.

These procedures may be carried out in food processing plant. Other areas of industrial application include hydrocarbon recovery in the oil industry, petrochemical processing and fine chemicals e.g. dyes and pharmaceuticals. With fine chemicals there is an advantage in the ability to clear a conduit with a smaller mass of cleaning material (e.g. ice, or other frozen solvent) than when using liquid cleaning. This aids economical recovery of high-value residues. Decontamination of conduit surfaces in general is a relevant field. Where there are toxic or otherwise dangerous residues there is again an advantage in relatively low-volume recovery.

Modes of application of the invention are now described by way of example, with reference to the accompanying drawings illustrating practical procedures and tests and in which FIG. 1 shows introduction of various media into a test pipe;

FIG. 2 shows separation of one food from another in a test pipe;

FIG. 3 shows a change of pipe cross-section;

Figure 5A:
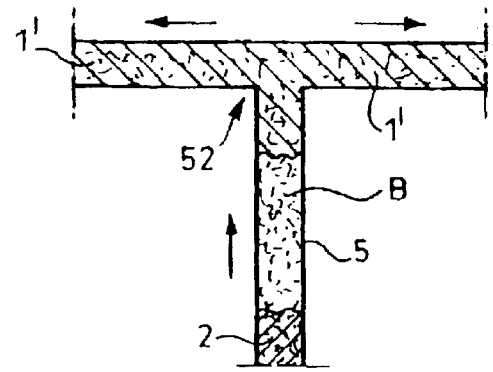
Figure 6:
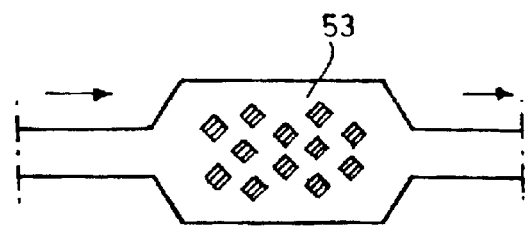

FIGS. 5a, b show stages of flow of two separated fluids through a branching pipe;

FIG. 6 shows flow through a mixer module, and

Figure 7A:
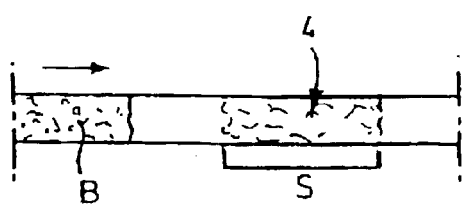

FIG. 7a, b shows stages of cleaning a pipe.

Preparation of pumpable ice was by dissolving sugar or salt in water, as a freezing point depressant, followed by freezing and crushing in a blender.

As is known, the freezing point depressant has the effect of stabilizing the co-existence of ice and melt water as a flowable preparation over a range of temperatures, because the dissolved freezing point depressant concentrates in the melt as freezing proceeds; the freezing point of the melt tends therefore to rise or fall in correspondence with rises and falls in the ambient temperature.

We found the resulting ice/water mixture or slush to be readily flowable and in particular it could be pumped through pipes using conventional pump pressures.

To test the effectiveness of this flowable ice in clearing, cleaning or separating food materials in pipes of food processing plant, we prepared laboratory test apparatus having transparent pipes so that the behaviour of the fluids could easily be observed.

At the input to the main test pipe 5 (FIG. 1) we connected respective input feed lines 11,12,13 for a first food product 1, a second food product 2 and pumpable ice B. A three-way valve 7 enabled any of these three substances to be pumped into the test pipe 5 according to choice at a given time. For easy visual assessment the "foods" 1,2 were differently-coloured cornflour-thickened aqueous preparations.

A collection vessel 6 is indicated at the downstream end of the pipe. It is possible to use detectors to determine characteristic ingredients in compositions passing along the pipe, to monitor flow and in particular the degree of any mixing of different compositions at interfaces. In the present tests a simple visual assessment was enough. The transparent pipe was 25 mm in internal diameter.

In a first test (FIG. 2) an initial flow of the first food 1 was followed by a brief flow of pumpable ice B to create a buffer region before a subsequent flow of the second food 2. We noted that the flowable ice plug B moved freely and coherently along the pipe, in full wetting contact with the internal surface, and there was little mingling at the interfaces of the ice plug B with the food columns 1,2. The leading end of the ice plug B cleared traces of the first food 1 from the pipe wall almost instantaneously, so that there was no perceivable contamination of the second food 2.

It will be appreciated that, in this way, a food processing plant may be able to send two different products down the same duct successively, very conveniently and without intervening downtime for cleaning.

In a second test an orifice plate 51 of internal diameter 10 mm was put in the test pipe. It was found that the crushed ice plug B flowed readily through the orifice and re-occupied the duct cross-section on the downstream side promptly, so that there was no residue of the first food 1 behind the orifice plate after the ice plug B had passed.

Figure 4:
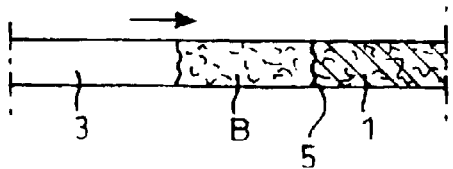
FIG. 4 shows clearing out a pipe.

FIG. 4 shows a third test in which the clearing action of the ice plug B left the pipe empty, the plug B being driven by pumping air. Again, the first food 1 was effectively cleared and the pipe wall left clean. There is evidently a cooperative effect of the solid and liquid simultaneously present in the plug B which cleans the pipe surface by a combination of wetting and wiping actions.

Figure 5B:
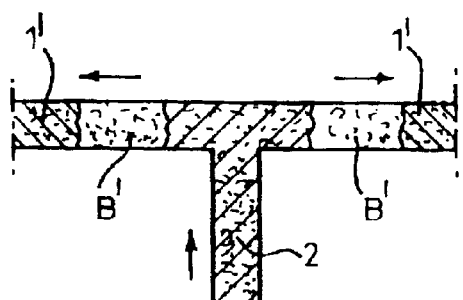

FIG. 5 shows a more demanding test where the test pipe 5 branched into two at a T-junction 52. The initial flow of first food diverged into two oppositely-directed flows 1'. As shown in FIG. 5b, we found that the initial flowable ice plug B divided readily at the junction 52 into two subsidiary plugs B' each following a respective branch of the junction and clearing the respective flow of the first food 1' as effectively as in the single pipe tests. It will be appreciated that pumpable ice can be introduced into the initial pipe in any desired quantity—corresponding to length of the initial plug B—to allow for divided plugs B' of sufficient size after divisions of this kind.

FIG. 6 shows a mixing module 53 included in the test pipe, having a flattened cross-section obstructed by an array of baffles between which fluid flows for mixing. As with the orifice plate, we found that the pumpable ice readily followed the intricacy of this system with sufficient wetting and wiping to clear the first food composition from it entirely.

Figure 7B:
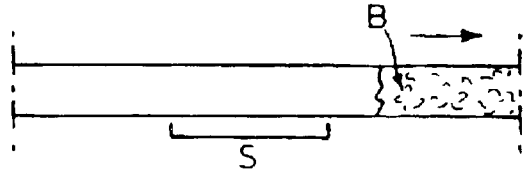

FIG. 7 shows a cleaning test, in which the internal surface of the otherwise empty test pipe was contaminated over a test section S by smearing with jam 4. By driving the pumpable ice preparation B along the pipe through the test section, we found that the adherent jam was completely cleared from the pipe; there was no visible residue.

A further good property noted was the remarkable temperature tolerance of the procedure, despite the use of ice in a system well above its melting point. We found that even in warm pipes the technique was effective. This is attributable to the poor thermal conductivity of ice, coupled with the ability of the shape of the mass to self-adjust under pumping pressure to continue filling the pipe despite surface melt losses.

Since the pumpable ice is an aqueous preparation containing only a benign solute as freezing point depressant, there is no health/safety problem with feeding it through food processing machinery.

In a further example the food product in the pipe was a fruit yogurt. The technical aim was to recover the yogurt from the pipe to the greatest possible extent. We froze a small batch of the yogurt and crushed the resulting frozen yogurt in a blender, as in the preceding experiment. A coherent mass of frozen yogurt particles was readily obtained, and we found that it could be pumped along the pipe, driving the resident liquid yogurt in front of it as readily as did the plain ice. Because the yogurt although essentially aqueous contains substantial quantities of dissolved solids and emulsified fat, the freezing point depressant effect arose naturally so that solid and some melt co-existed readily. The pumped plug of frozen yogurt slush cleared the pipe out effectively. Although the frozen part of the yogurt was of a rather poor quality when thawed, the immediately adjacent part of the column of liquid yogurt maintained its quality perfectly and could be used.

What is claimed is:

1. A method of clearing, cleaning or providing a movable plug in a fluid flow conduit, comprising the steps of: providing a mass of frozen solid particles made by freezing an aqueous or organic liquid; introducing the mass of frozen solid particles into the fluid flow conduit to constitute a body therein, the body comprising a flowable agglomerate mass of the frozen solid particles and of a wetting liquid which comprises the aqueous or organic liquid and a freezing point depressant, the solid particles cohering with one another by means of the wetting liquid; and causing the body to pass along an interior surface of the conduit resulting in contacting of the interior surface of the conduit with the mass of said frozen solid particles.

2. A method according to claim 1, wherein the wetting liquid consists essentially of said aqueous or organic liquid and of said freezing point depressant.

3. A method according to claim 1 wherein the particles are made by freezing the aqueous liquid and the wetting liquid comprises said aqueous liquid.

4. A method according to claim 1 in which the particles are a frozen liquid food or drink, or frozen liquid ingredient of a food or drink.

5. A method according to claim 2 in which the particle are ice particles.

6. A method according to claim 3 in which the freezing point depressant is one of sugar and salt.

7. A method of clearing, cleaning or providing a movable plug in a fluid flow conduit, comprising the steps of: providing a mass of frozen solid particles made by freezing an aqueous or organic liquid; introducing the mass of frozen solid particles into the fluid flow conduit to constitute a body therein, the body comprising a fluidly flowable and dividable agglomerate mass of the frozen solid particles and a wetting liquid which comprises said aqueous or organic liquid and a freezing point depressant, the frozen solid particles cohering with one another by the wetting liquid; and causing the body to pass along the conduit resulting in plugging of the conduit, and in which the fluid flow conduit has any one or more of the following features:

greater than a 20% change in lateral cross-sectional area of the conduit;

internal local obstructions projecting into the conduit;

branching of the conduit, such that the flowable agglomerate mass divides at the branching of the conduit.

8. A method according to claim 7, wherein the freezing point depressant is either one of sugar or salt.

9. A method according to claim 7, wherein the solid particles are ice particles having a particle size of up to 5 mm.

10. A method according to claim 7 in which the solid particles are ice particles and the wetting liquid is water.

11. A method according to claim 10 in which the water contains one of the sugar and salt as a freezing point depressant.

* * * * *